(12) United States Patent
Li et al.

(10) Patent No.: US 11,617,148 B2
(45) Date of Patent: Mar. 28, 2023

(54) ENHANCEMENT OF FLEXIBILITY TO CHANGE STS INDEX/COUNTER FOR IEEE 802.15.4Z

(71) Applicant: Samsung Electronics Co., Ltd., Suwon-si (KR)

(72) Inventors: Zheda Li, Plano, TX (US); Aditya V. Padaki, Richardson, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 15/929,362

(22) Filed: Apr. 28, 2020

(65) Prior Publication Data

US 2020/0351811 A1 Nov. 5, 2020

Related U.S. Application Data

(60) Provisional application No. 62/842,968, filed on May 3, 2019.

(51) Int. Cl.
| | |
|---|---|
| *H04W 64/00* | (2009.01) |
| *H04W 12/63* | (2021.01) |
| *G01S 7/00* | (2006.01) |
| *G01S 13/79* | (2006.01) |

(52) U.S. Cl.
CPC ............. *H04W 64/00* (2013.01); *G01S 7/003* (2013.01); *G01S 13/79* (2013.01)

(58) Field of Classification Search
CPC ....... H04L 9/065; H04L 9/12; H04L 2209/80; H04W 12/61; H04W 12/63; H04W 12/104; H04W 64/00; G01S 13/765; G01S 7/003; G01S 13/79; G01S 7/006
See application file for complete search history.

(56) References Cited

U.S. PATENT DOCUMENTS

| | | | |
|---|---|---|---|
| 10,559,149 B1* | 2/2020 | Kuechler | G07C 9/00309 |
| 10,944,552 B2* | 3/2021 | Leong | H04L 63/0464 |
| 11,233,533 B1* | 1/2022 | Zhao | H04B 1/06 |

(Continued)

FOREIGN PATENT DOCUMENTS

WO 2017146861 A1 8/2017

OTHER PUBLICATIONS

"IEEE Standard for Wireless Medium Access Control (MAC) and Physical Layer (PHY) Specifications for Peer Aware Communications (PAC)", IEEE Computer Society, IEEE Std 802.15.8TM, Dec. 2017, 322 pages.

(Continued)

*Primary Examiner* — Khawar Iqbal

(57) ABSTRACT

A method and apparatus of a first network entity in a wireless communication system is provide. The method and apparatus comprises: identifying at least one set of bit strings to generate a ranging scrambled timestamp sequence (STS); identifying at least one initialization vector (IV) field corresponding to the at least one set of bit strings, wherein the at least one IV field comprises a 4-octet string; generating a ranging STS key and IV information element (RSKI IE) that includes the at least one IV field to convey and align a seed that is used to generate the ranging STS; and transmitting, to a second network entity, the generated RSKI IE for updating the ranging STS of the second network entity.

20 Claims, 13 Drawing Sheets

(56) References Cited

U.S. PATENT DOCUMENTS

| | | | | |
|---|---|---|---|---|
| 2008/0170691 | A1* | 7/2008 | Chang | H04L 63/062 380/28 |
| 2013/0083774 | A1* | 4/2013 | Son | H04W 36/0058 370/331 |
| 2017/0026805 | A1* | 1/2017 | Smith | H04W 4/026 |
| 2017/0251449 | A1* | 8/2017 | Malik | H04W 56/0065 |
| 2018/0013480 | A1* | 1/2018 | Lomayev | H04L 5/0023 |
| 2019/0116223 | A1* | 4/2019 | Qi | H04W 4/023 |
| 2020/0014526 | A1* | 1/2020 | Hammerschmidt | H04L 25/0212 |
| 2020/0081778 | A1* | 3/2020 | Varanasi | H03M 13/373 |
| 2020/0153613 | A1* | 5/2020 | Hale | H04L 9/0643 |
| 2020/0228331 | A1* | 7/2020 | de Perthuis | H04L 9/0872 |
| 2020/0278430 | A1* | 9/2020 | Zhu | G01S 7/487 |
| 2020/0355819 | A1* | 11/2020 | Padaki | H04W 8/00 |
| 2020/0359275 | A1* | 11/2020 | Li | H04W 74/002 |
| 2021/0014677 | A1* | 1/2021 | Han | H04W 12/122 |
| 2021/0173957 | A1* | 6/2021 | Kawai | G06F 17/16 |
| 2022/0051119 | A1* | 2/2022 | Rivera | G06N 20/00 |
| 2022/0123784 | A1* | 4/2022 | Lim | H04W 12/041 |

OTHER PUBLICATIONS

"IEEE Standard for Low-Rate Wireless Networks", IEEE Computer Society, IEEE Std 802.15.4TM, Dec. 2015, 708 pages.

International Search Report and Written Opinion of the International Searching Authority in connection with International Patent Application No. PCT/KR2020/005768 dated Jul. 31, 2020, 9 pages.

Jeong, et al., Project: IEEE P802.15 Working Group for Wireless Personal Area Networks (WPANs), "Inclusion of Ranging FoM in Information Element," Nov. 2018, 8 pages.

Lee, et al., Project: IEEE P802.15 Working Group for Wireless Personal Area Networks (WPANs), "IEEE 802.15.4z MAC for Ranging," Dec. 2018, 67 pages.

Leu, et al., Project: IEEE P802.15 Working Group for Wireless Personal Area Networks (WPANs), "IEEE 802.15.4z MAC," Apr. 1, 2019 (revision 02), 13 pages.

Extended European Search Report dated Mar. 31, 2022 regarding Application No. 20802256.6, 15 pages.

Lan/Man Standards Committee of the IEEE Computer, "P802.15.4z(TM)/D0I Draft Standard for Low-Rate Wireless Networks Amendment: Enhanced Ultra Wide-Band (UWB) Physical Layers (PHYs) and Associated Ranging Techniques", IEEE Draft; P802.15.4Z-D1, IEEE-SA, vol. 802 15 EIR drafts; 802 15 4z drafts, No. D1, Apr. 2019, 143 pages.

Lan/Man Standards Committee of the IEEE Computer, "P802.15.4z(TM)/D0O Draft Standard for Low-Rate Wireless Networks Amendment: Enhanced Ultra Wide-Band (UWB) Physical Layers (PHYs) and Associated Ranging Techniques", IEEE Draft; P802.15.4Z_D00.6E, IEEE-SA, vol. 802.15 EIR drafts; 802.15.4z drafts, No. D00.6, Feb. 2019, 119 pages.

Jack Lee (Samsung) et al., "IEEE 802.15.4z Mac", IEEE Draft; 15-19-0034-01-004Z-IEEE-802-15-4Z-MAC, IEEE-SA Mentor, vol. 802.15 EIR; 802.15.4z, No. 1, Jan. 2019, 50 pages.

Zheda Li (Samsung) et al., "HRP comment resolutions", IEEE Draft; 15-19-0253-02-004Z-HRP-COMMENT-RESOLUTIONS, IEEE-SA Mentor, vol. 802.15 EIR; 802.15.4z, No. 2, May 2019, 33 pages.

Lan/Man Standards Committee of the IEEE Computer, "P802.15.4z(TM)/D02 Draft Standard for Low-Rate Wireless Networks Amendment: Enhanced Ultra Wide-Band (UWB) Physical Layers (PHYs) and Associated Ranging Techniques", IEEE Draft; P802.15.4Z-D2, IEEE-SA, vol. 802.15 EIR drafts; 802.15.4z drafts, No. D2, Aug. 2019, 171 pages.

* cited by examiner

FIG. 14 (1400)

| Bits: 1 | 1 | 2 | 1 | 3 | Octets : 4/16 | 0/16 | 0/4/8/16 |
|---|---|---|---|---|---|---|---|
| IVC | SKP | ICP | CP | Reserved | STS IV Counter | STS Key | Integrity Code |

FIG. 15 (1500)

| Bits: 4 | 1 | 2 | 1 | Octets : 4/8/12/16 | 0/16 | 0/4/8/16 |
|---|---|---|---|---|---|---|
| IVP | SKP | ICP | CP | STS IV Counter | STS Key | Integrity Code |

FIG. 16 (1600)

| Bits: 4 | 4 | 1 | 2 | 1 | 4 | Octets : 1~16 | 0/16 | 0/4/8/16 |
|---|---|---|---|---|---|---|---|---|
| IVS | IVE | SKP | ICP | CP | Reserved | STS IV Counter | STS Key | Integrity Code |

ENHANCEMENT OF FLEXIBILITY TO CHANGE STS INDEX/COUNTER FOR IEEE 802.15.4Z

CROSS-REFERENCE TO RELATED APPLICATIONS AND CLAIM OF PRIORITY

The present application claims priority to U.S. Provisional Patent Application No. 62/842,968 filed on May 3, 2019. The content of the above-identified patent documents is incorporated herein by reference.

TECHNICAL FIELD

The present disclosure relates generally to wireless communication system. In particular, enhancement of flexibility to change STS index/counter for IEEE 802.15.4z is presented.

BACKGROUND

A peer aware communication (PAC) network is a fully distributed communication network that allows direct communication among the PAC devices (PDs). PAC networks may employ several topologies like mesh, star, etc. to support interactions among the PDs for various services.

SUMMARY

Embodiments of the present disclosure provide enhancement of flexibility to change STS index/counter for IEEE 802.15.4z.

In one embodiment, a first network entity in a wireless communication system is provided. The first network entity comprises a processor configured to: identify at least one set of bit strings to generate a ranging scrambled timestamp sequence (STS); identify at least one initialization vector (IV) field corresponding to the at least one set of bit strings, wherein the at least one IV field comprises a 4-octet string; and generate a ranging STS key and IV information element (RSKI IE) that includes the at least one IV field to convey and align a seed that is used to generate the ranging STS. The first network entity further comprises a transceiver operably connected to the processor, the transceiver configured to transmit, to a second network entity, the generated RSKI IE for updating the ranging STS of the second network entity.

In another embodiment, a second network entity in a wireless communication system is provided. The second network entity comprises a transceiver configured to receive, from a first network entity, a ranging scrambled timestamp sequence (STS) key and initialization vector (IV) information element (RSKI IE) for updating a ranging STS. The second network entity further comprises a processor operably connected to the transceiver, the processor configured to: identify the RSKI IE including at least one IV field to be used to convey and align a seed that is used to generate a ranging STS; identify the at least one IV field corresponding to at least one set of bit strings, wherein the at least one IV field comprises a 4-octet string; and identify the at least one set of bit strings to identify the ranging STS.

In yet another embodiment, a method of a first network entity in a wireless communication system is provided. The method comprises: identifying at least one set of bit strings to generate a ranging scrambled timestamp sequence (STS); identifying at least one initialization vector (IV) field corresponding to the at least one set of bit strings, wherein the at least one IV field comprises a 4-octet string; generating a ranging STS key and IV information element (RSKI IE) that includes the at least one IV field to convey and align a seed that is used to generate the ranging STS; and transmitting, to a second network entity, the generated RSKI IE for updating the ranging STS of the second network entity.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 illustrates an example RSKI IE content field format according to embodiments of the present disclosure;

FIG. 15 illustrates an example modified content field format of RSKI IE according to embodiments of the present disclosure;

FIG. 16 illustrates another example modified content field format of RSKI IE according to embodiments of the present disclosure.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: IEEE Standard for Wireless Medium Access Control (MAC) and Physical Layer (PHY) Specifications for Peer Aware Communications, IEEE Std 802.15.8, 2017; and IEEE Standard Wireless Medium Access Control (MAC) and Physical Layer (PHY) Specifications for Low Rate Wireless Personal Area Networks (WPANs), IEEE Std 802.15.4, 2105.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

Figure 1:
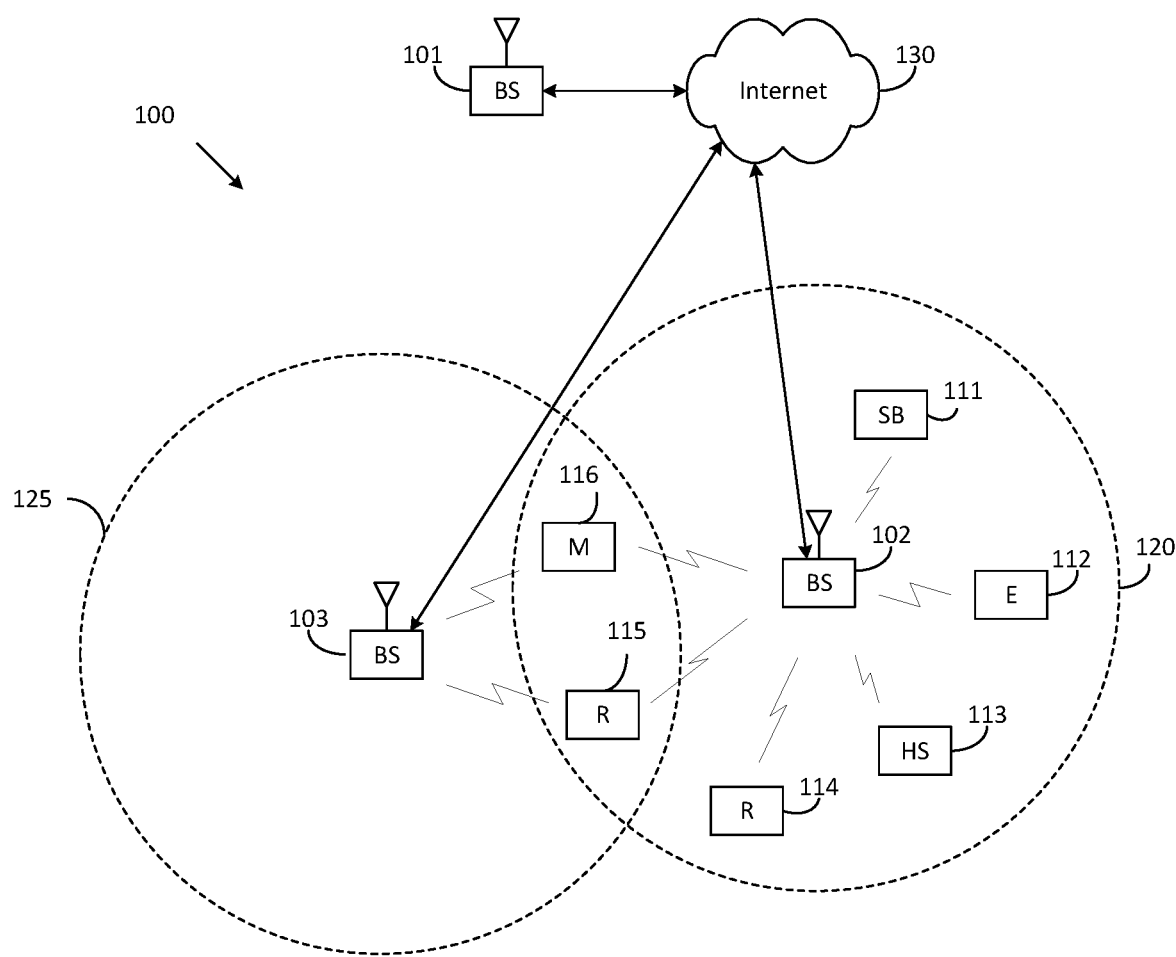
FIG. 1 illustrates an example wireless network according to embodiments of the present disclosure.
Figure 2:
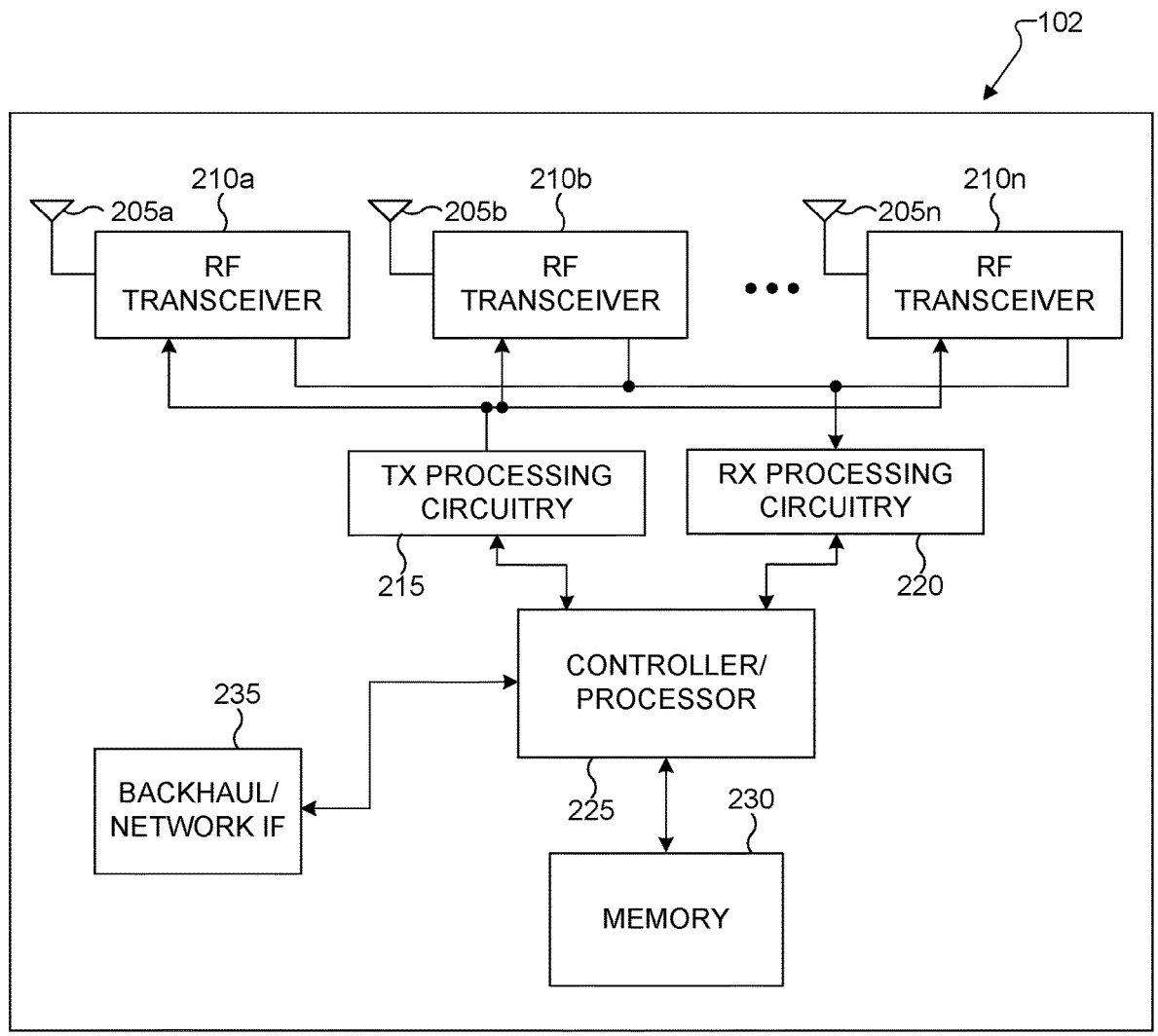
FIG. 2 illustrates an example gNB according to embodiments of the present disclosure.
Figure 3:
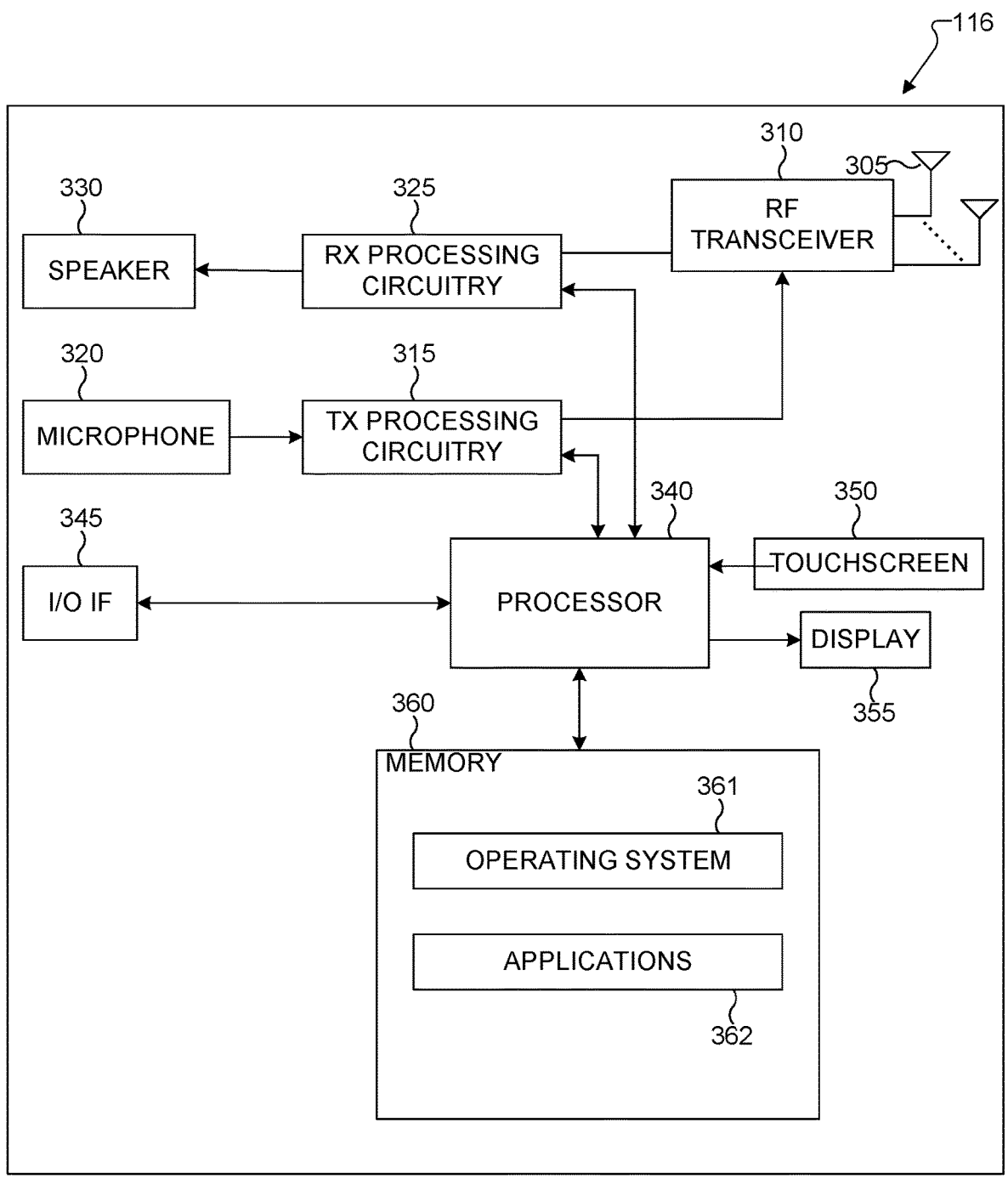
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101 (e.g., base station (BS)), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for changing an STS index/counter for IEEE 802.15.4z communications. In certain embodiments, and one or more of the gNBs 101-103 includes circuitry, programing, or a combination thereof, for changing an STS index/counter for IEEE 802.15.4z communications.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
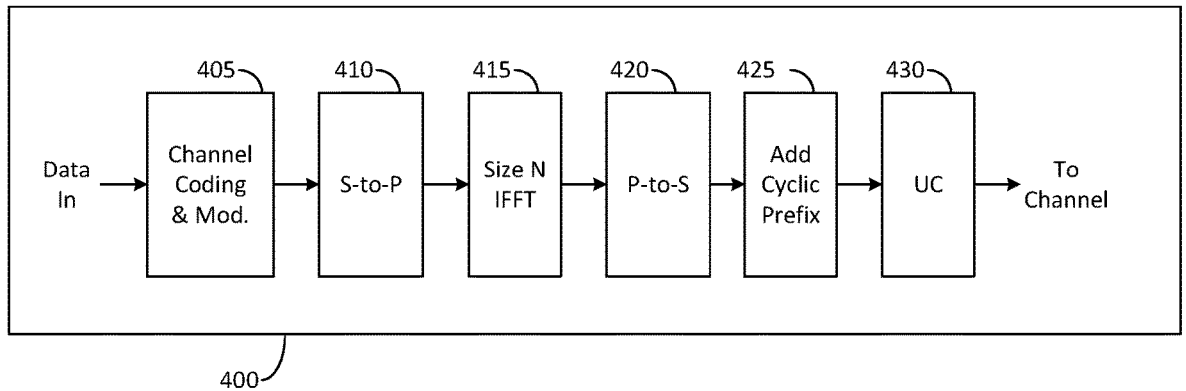
FIG. 4A illustrates a high-level diagram of an orthogonal frequency division multiple access transmit path according to embodiments of the present disclosure.
Figure 4B:
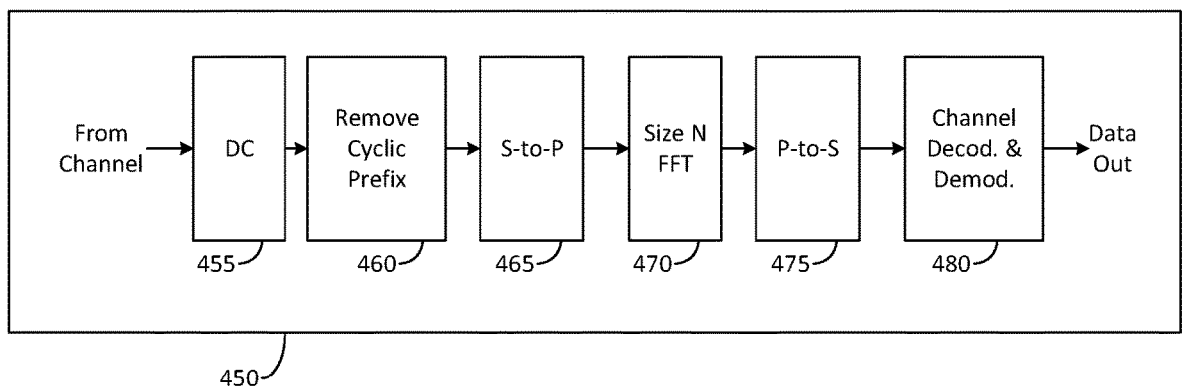
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the present disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116 Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

A peer aware communication (PAC) network is a fully distributed communication network that allows direct communication among the PAC devices (PDs). PAC networks may employ several topologies like mesh, star, etc. to support interactions among the PDs for various services. While the present disclosure uses PAC networks and PDs as an example to develop and illustrate the present disclosure, it is to be noted that the present disclosure is not confined to these networks. The general concepts developed in the present disclosure may be employed in various type of networks with different kind of scenarios.

Figure 5:
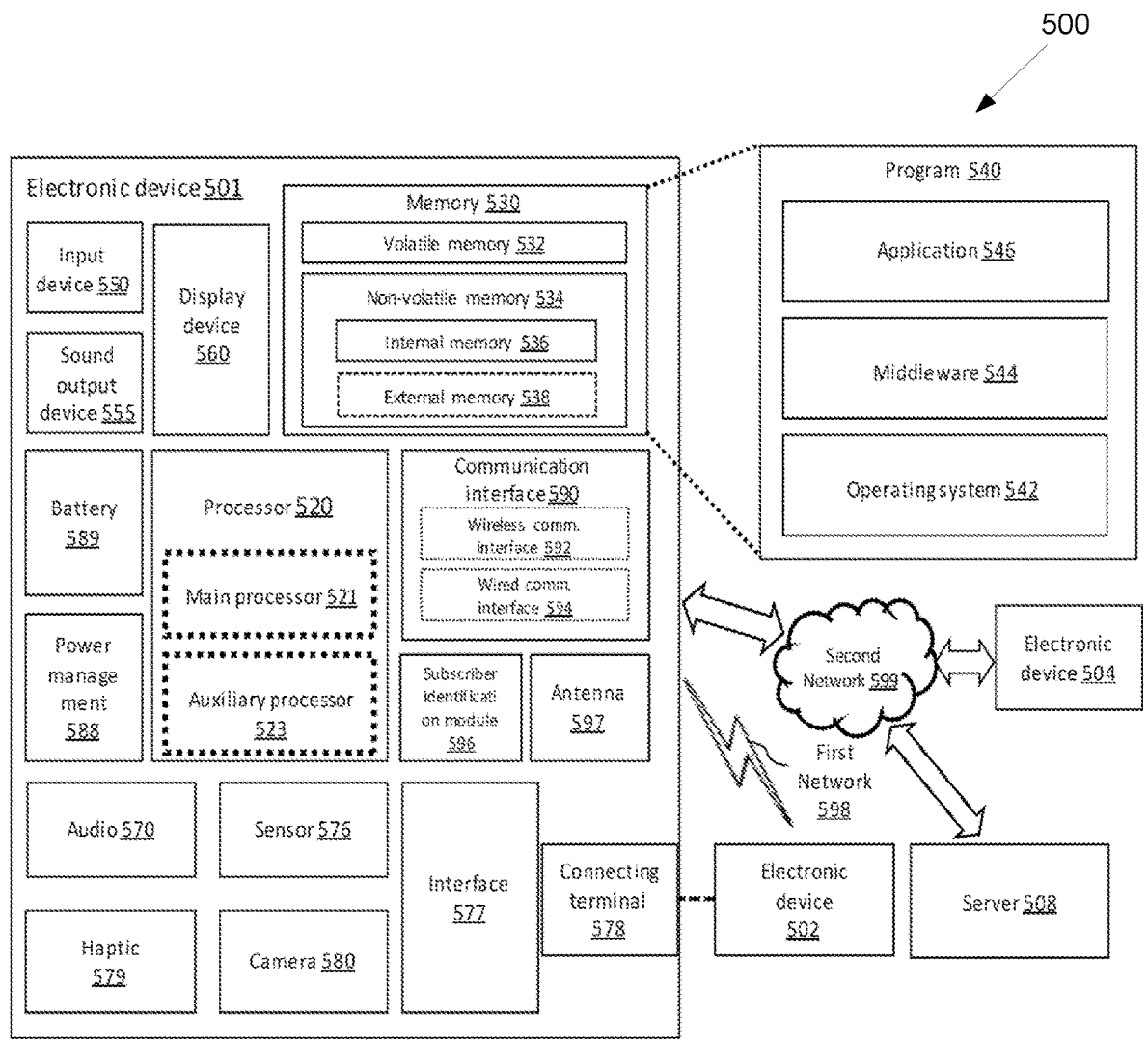
FIG. 5 illustrates an example electronic device according to embodiments of the present disclosure.

FIG. 5 illustrates an example electronic device 501 according to embodiments of the present disclosure. The embodiment of the electronic device 501 illustrated in FIG. 5 is for illustration only. FIG. 5 does not limit the scope of the present disclosure to any particular implementation. The electronic device 501 may be performed a function or functions of 111-116 as illustrated in FIG. 1. In one embodiment, the electronic device may be 111-116 and/or 101-103 as illustrated in FIG. 1.

PDs can be an electronic device. FIG. 5 illustrates an example electronic device 501 according to various embodiments. Referring to FIG. 5, the electronic device 501 may communicate with an electronic device 502 via a first network 598 (e.g., a short-range wireless communication network), or an electronic device 104 or a server 508 via a second network 599 (e.g., a long-range wireless communication network). According to an embodiment, the electronic device 501 may communicate with the electronic device 504 via the server 508.

According to an embodiment, the electronic device 501 may include a processor 520, memory 530, an input device 550, a sound output device 555, a display device 560, an audio 570, a sensor 576, an interface 577, a haptic 579, a camera 580, a power management 588, a battery 589, a communication interface 590, a subscriber identification module (SIM) 596, or an antenna 597. In some embodiments, at least one (e.g., the display device 560 or the camera 580) of the components may be omitted from the electronic device 501, or one or more other components may be added in the electronic device 501. In some embodiments, some of the components may be implemented as single integrated circuitry. For example, the sensor 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520 and may perform various data processing or computation. According to one embodiment of the present disclosure, as at least part of the data processing or computation, the processor 520 may load a command or data received from another component (e.g., the sensor 576 or the communication interface 590) in volatile memory 532, process the command or the data stored in the volatile memory 532, and store resulting data in non-volatile memory 534.

According to an embodiment of the present disclosure, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally, or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor 576, or the communication interface 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera 580 or the communication interface 190) functionally related to the auxiliary processor 523.

The memory 530 may store various data used by at least one component (e.g., the processor 520 or the sensor 576) of the electronic device 501. The various data may include, for example, software (e.g., the program 540) and input data or output data for a command related thereto. The memory 530 may include the volatile memory 532 or the non-volatile memory 534.

The program 50 may be stored in the memory 530 as software, and may include, for example, an operating system (OS) 542, middleware 544, or an application 546.

The input device 550 may receive a command or data to be used by another component (e.g., the processor 520) of the electronic device 501, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the displays, hologram device, and projector. According to an embodiment, the display device 560 may include touch circuitry adapted to detect a touch, or sensor circuitry (e.g., a pressure sensor) adapted to measure the intensity of force incurred by the touch.

The audio 570 may convert a sound into an electrical signal and vice versa. According to an embodiment, the audio 570 may obtain the sound via the input device 550, or output the sound via the sound output device 555 or a headphone of an external electronic device (e.g., an electronic device 502) directly (e.g., using wired line) or wirelessly coupled with the electronic device 501.

The sensor 576 may detect an operational state (e.g., power or temperature) of the electronic device #01 or an environmental state (e.g., a state of a user) external to the electronic device 501, and then generate an electrical signal or data value corresponding to the detected state. According to an embodiment, the sensor 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., using wired line) or wirelessly. According to an embodiment of the present disclosure, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic 579 may convert an electrical signal into a mechanical stimulus (e.g., a vibration or a movement) or electrical stimulus which may be recognized by a user via his tactile sensation or kinesthetic sensation. According to an embodiment, the haptic 579 may include, for example, a motor, a piezoelectric element, or an electric stimulator.

The camera 580 may capture a still image or moving images. According to an embodiment of the present disclosure, the camera 580 may include one or more lenses, image sensors, image signal processors, or flashes.

The power management 588 may manage power supplied to the electronic device 501. According to one embodiment, the power management 588 may be implemented as at least part of, for example, a power management integrated circuit (PMIC). The battery 589 may supply power to at least one component of the electronic device 501. According to an embodiment, the battery 589 may include, for example, a primary cell which is not rechargeable, a secondary cell which is rechargeable, or a fuel cell.

The communication interface 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication interface 590 may include one or more communication processors that are operable independently from the processor 520 (e.g., the application processor (AP)) and supports a direct (e.g., wired) communication or a wireless communication.

According to an embodiment of the present disclosure, the communication interface 590 may include a wireless communication interface 592 (e.g., a cellular communication interface, a short-range wireless communication interface, or a global navigation satellite system (GNSS) communication interface) or a wired communication interface 594 (e.g., a local area network (LAN) communication interface or a power line communication (PLC)). A corresponding one of these communication interfaces may communicate with the external electronic device via the first network 598 (e.g., a short-range communication network, such as Bluetooth, wireless-fidelity (Wi-Fi) direct, ultra-wide band (UWB), or infrared data association (IrDA)) or the second network 599 (e.g., a long-range communication network, such as a cellular network, the Internet, or a computer network (e.g., LAN or wide area network (WAN)).

These various types of communication interfaces may be implemented as a single component (e.g., a single chip), or may be implemented as multi components (e.g., multi chips) separate from each other. The wireless communication interface 592 may identify and authenticate the electronic device 501 in a communication network, such as the first network 598 or the second network 599, using subscriber information (e.g., international mobile subscriber identity (IMSI)) stored in the subscriber identification module 596.

The antenna 597 may transmit or receive a signal or power to or from the outside (e.g., the external electronic device) of the electronic device 501. According to an embodiment, the antenna 597 may include an antenna including a radiating element composed of a conductive material or a conductive pattern formed in or on a substrate (e.g., PCB). According to an embodiment, the antenna 597 may include a plurality of antennas. In such a case, at least one antenna appropriate for a communication scheme used in the communication network, such as the first network 198 or the second network 599, may be selected, for example, by the communication interface 590 (e.g., the wireless communication interface 592) from the plurality of antennas. The signal or the power may then be transmitted or received between the communication interface 590 and the external electronic device via the selected at least one antenna. According to an embodiment, another component (e.g., a radio frequency integrated circuit (RFIC)) other than the radiating element may be additionally formed as part of the antenna 597.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment of the present disclosure, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 may perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

Various embodiments as set forth herein may be implemented as software (e.g., the program 140) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the present disclosure, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the present disclosure, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as one or more functions are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Ultra-wideband communication, realized by sending a short radio pulse, brings some key benefits to wireless communications, including low-complexity transceiver design, large capacity by utilizing large bandwidth, and robustness to inter-symbol-interference (ISI) of multi-path environment. Meanwhile, the extremely narrow pulses also lower the probability of interception and detection by the third party, which is promising for the data service with highly secure requirement, e.g., secure ranging. Currently, IEEE 802.15.4z is exploring and developing enhancements for capabilities of low rate and high rate UWB impulse radio, aiming to provide better integrity and efficiency.

Ranging and relative localization are essential for various location-based services and applications, e.g., Wi-Fi direct, internet-of-things (IoTs), etc. With the tremendous increasing of network devices, high demands of ranging requests can be foreseen in the near future, which implies overall ranging message exchanges occur frequently in the network. This may worsen the bottleneck limited by the battery capacity. Energy efficiency becomes more critical for mobile devices, and self-sustained static devices, e.g., low-power sensors.

Another critical issue in the dense environment is the latency to fulfill the scheduled ranging sessions for different ranging pairs. Based on the ranging procedures as defined in IEEE specification, each ranging pair may be assigned with dedicated time slots. It may result in long latency for latter scheduled pairs if there exist large amounts of ranging requests.

Figure 6:
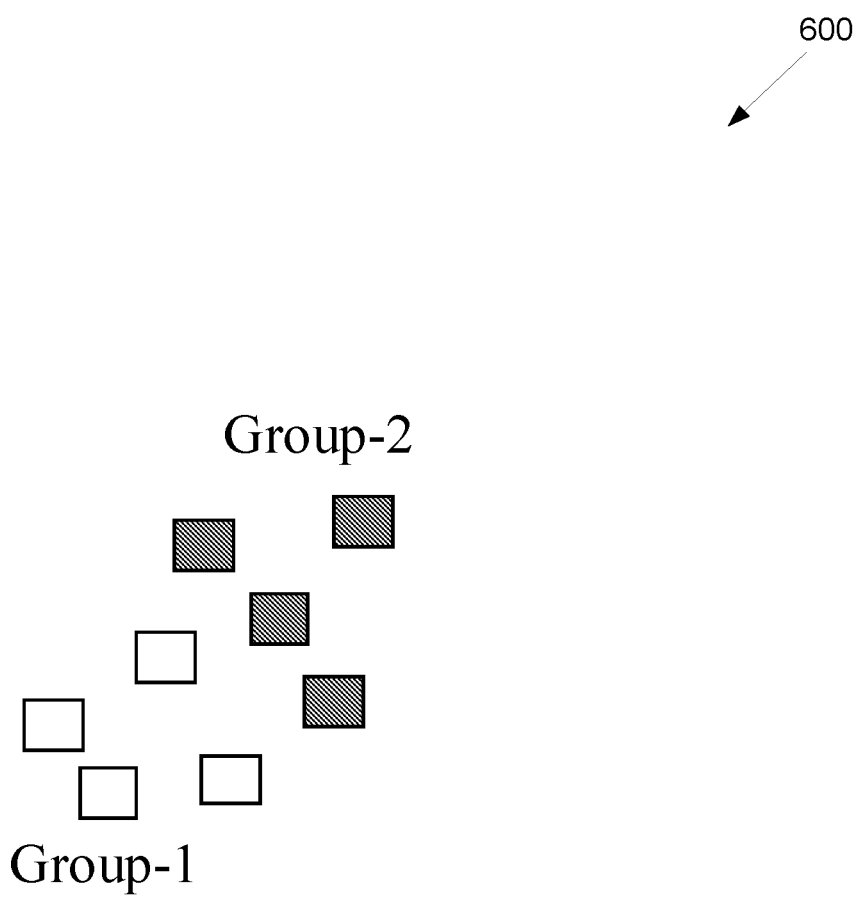
FIG. 6 illustrates an example many-to-many scenario according to embodiments of the present disclosure.

Therefore, implementation of more efficient ranging protocols is necessary to reduce the number of required message exchanges for many ranging pairs. In the present disclosure, the optimized ranging procedure is provided between a group of devices and another group of devices. As illustrated in FIG. 6, one or more devices of group-1 has the ranging request to one or more devices of group-2 or vice versa. Exploiting the broadcast characteristics of wireless channel, mechanisms of optimized transmissions can be respectively realized based on the ranging operation, i.e., single-sided two-way ranging (SS-TWR) and double-sided two-way ranging (DS-TWR), which significantly reduce the number of required information exchange, compared with the current standard.

FIG. 6 illustrates an example many-to-many scenario 600 according to embodiments of the present disclosure. The embodiment of the many-to-many scenario 600 illustrated in FIG. 6 is for illustration only. FIG. 6 does not limit the scope of the present disclosure to any particular implementation. As illustrated in FIG. 6, each node in group 1 and group 2 may performs a function or functions of 111-116 and 101-103 as illustrated in FIG. 1. In one embodiment, each node in group 1 and group 2 may be one of 111-116 and/or be one of 101-103 as illustrated in FIG. 1.

As illustrated in FIG. 6, group-1 and group 2 determined with one or more devices. One or more devices from group-1 have ranging requests to one or more devices from group-2.

In the present disclosure, for a pair of devices to fulfill message exchange of ranging, the devices and associated messages is provided by following respective terms: initiator; device which initializes and sends the first ranging frame (RFRAME) to one or more responders; responder, device which expects to receive the first RFRAME from one or more initiators; poll, RFRAME sent by initiator, and ranging response. RFRAME is sent by responder.

There are two aspects neglected in IEEE standard specification, which are essential for future use cases. The first one is the optimized transmission procedure between one or more initiators and one or more responders, which can be critical for energy-saving purpose. Since a poll can be broadcast to multiple responders, an initiator can initialize a multicast, i.e., one-to-many, ranging round by sending a single poll instead of launching multiple unicast ranging rounds. Similarly, since the ranging response can also be broadcast to multiple initiators, a responder can embed the requested data respectively from different initiator in a single ranging response message. Exploiting the broadcast characteristics of wireless channel, the optimized transmission procedure is promising for future UWB network.

The other neglected aspect is the option for the contention-based ranging in an UWB network. In IEEE specification, one ranging round just contains a single pair of devices, i.e., one initiator and one responder. Within one ranging round, transmissions are implicitly scheduled: a responder/initiator expects to receive the message from the far end and may start to transmit afterwards. multiple ranging rounds can be scheduled by the CFP table of the sync frame. However, there can be other use cases that cannot be supported by IEEE standard specification. For example, the initiator broadcasts the poll, but the initiator does not have the prior-knowledge of who may response. Similarly, the responder may not have the prior-knowledge of who may initialize the ranging, so the responder can wait and listen for a certain period of time to collect polls respectively from different initiators.

In the present disclosure, an UWB network is provided with ranging requests between a group of devices and another group of devices. As shown in FIG. 6, one or more devices of group-1 has the ranging request to one or more devices of group-2 or vice versa. To accommodate optimized ranging transmission procedure and other new use cases, the configuration of device role, i.e., whether the configuration of device is an initiator or a responder, and the scheduling information for scheduling-based ranging, need to be determined and exchanged before the ranging round starts. Aiming to build a stand-alone UWB network, the present disclosure defines new control IE, and ranging scheduling IE for initiators and responders, which can be exchanged over the UWB MAC. However, the present disclosure does not preclude other methods to exchange information via the higher layer or out-of-band management.

Figure 7:
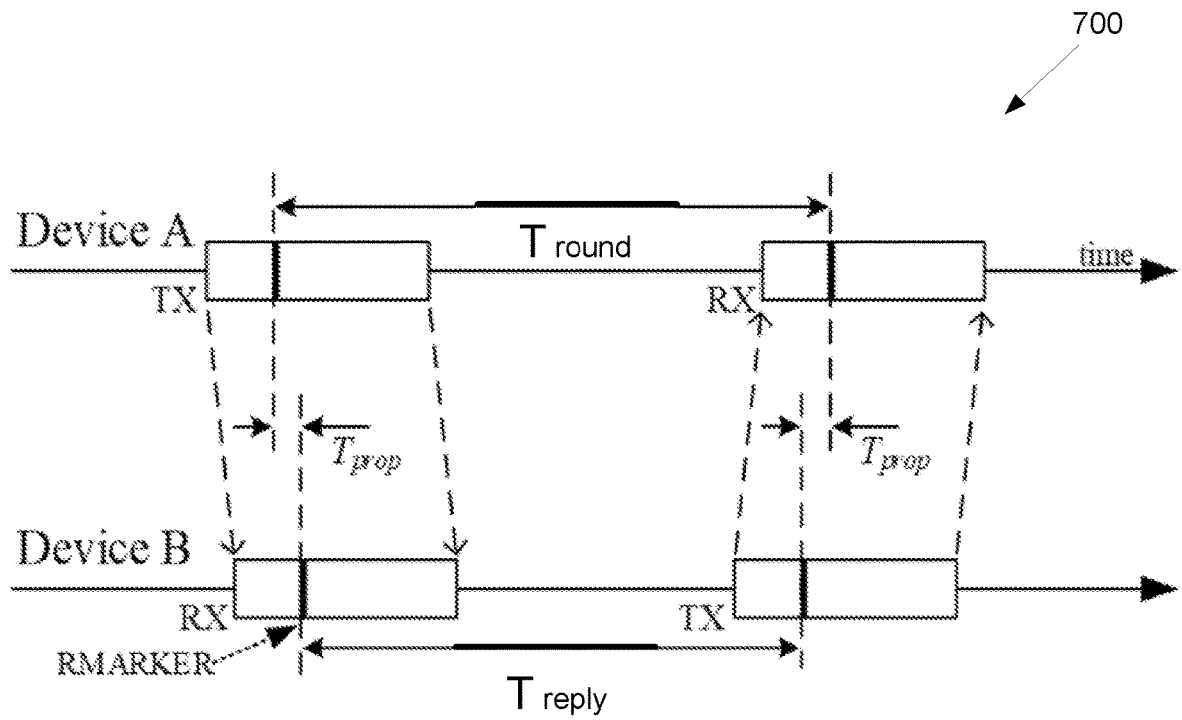
FIG. 7 illustrates an example single-sided two-way ranging according to embodiments of the present disclosure.

FIG. 7 illustrates an example single-sided two-way ranging 700 according to embodiments of the present disclosure. The embodiment of the single-sided two-way ranging 700 illustrated in FIG. 7 is for illustration only. FIG. 7 does not limit the scope of the present disclosure to any particular implementation. The single-sided two-way ranging 700 may be performed in the electronic device 501 as illustrated in FIG. 5.

SS-TWR involves a simple measurement of the round-trip delay of a single message from the initiator to the responder and a response sent back to the initiator. The operation of SS-TWR is as shown in FIG. 7, where device A initiates the exchange and device B responds to complete the exchange. Each device precisely timestamps the transmission and reception times of the message frames, and so can calculate times $T_{round}$ and $T_{reply}$ by simple subtraction. Hence, the resultant time-of-flight, $T_{prop}$, can be estimated by the equation: $\hat{T}_{prop} = \frac{1}{2}(T_{round} - T_{reply})$.

Figure 8:
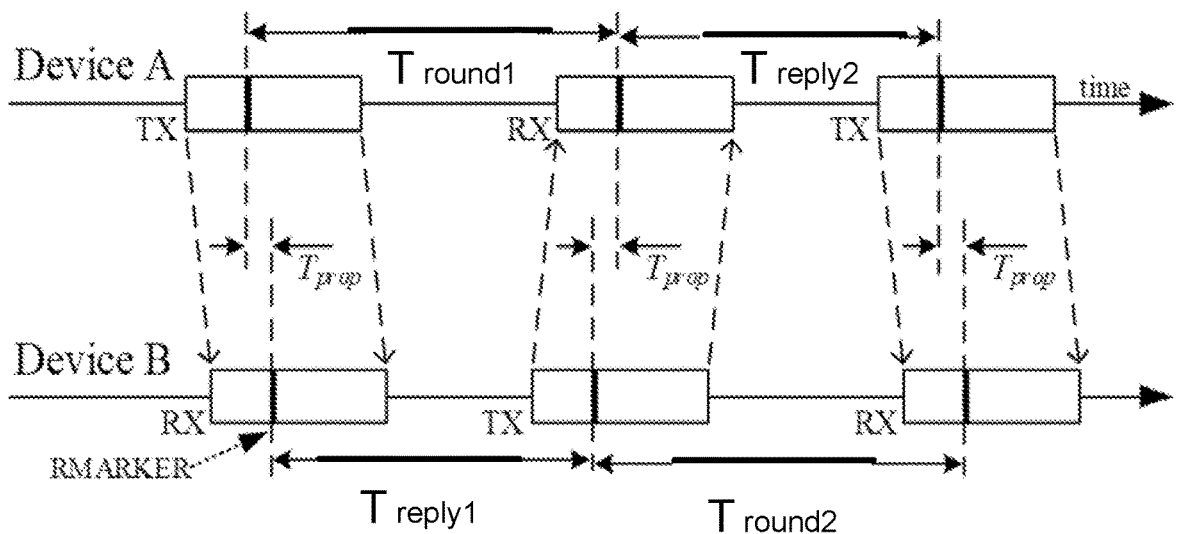
FIG. 8 illustrates an example double-sided two-way ranging with three messages according to embodiments of the present disclosure.

FIG. 8 illustrates an example double-sided two-way ranging with three messages 800 according to embodiments of the present disclosure. The embodiment of the double-sided two-way ranging with three messages 800 illustrated in FIG. 8 is for illustration only. FIG. 8 does not limit the scope of the present disclosure to any particular implementation. The double-sided two-way ranging with three messages 800 may be performed in the electronic device 501 as illustrated in FIG. 5.

DS-TWR with three messages is illustrated in FIG. 8, which reduces the estimation error induced by clock drift from long response delays. Device A is the initiator to initialize the first round-trip measurement, while device B as the responder, responses to complete the first round-trip measurement, and meanwhile initialize the second round-trip measurement. Each device precisely timestamps the transmission and reception times of the messages, and the resultant time-of-flight estimate, $T_{prop}$, can be calculated by the expression:

$$\hat{T}_{prop} = \frac{(T_{round1} \times T_{round2} - T_{reply1} \times T_{reply2})}{(T_{round1} + T_{round2} + T_{reply1} + T_{reply2})}.$$

In the development of IEEE 802.15.4z, the main enhancement for secure ranging is the inclusion a scrambled timestamp sequence (STS) in the basic PHY protocol data unit (PPDU) format. Since the unique STS of a device is known by one or more far ends in a trusted group, the secure ranging can be performed within the trusted group, and the chance of being attacked is significantly reduced. In the present disclosure, it is provided that STSs of devices have been exchanged successfully, which can be done via, e.g., a higher layer control or out-of-band management. How to initialize/update STS and exchange it between devices is out of the scope of this disclosure.

Figure 9:
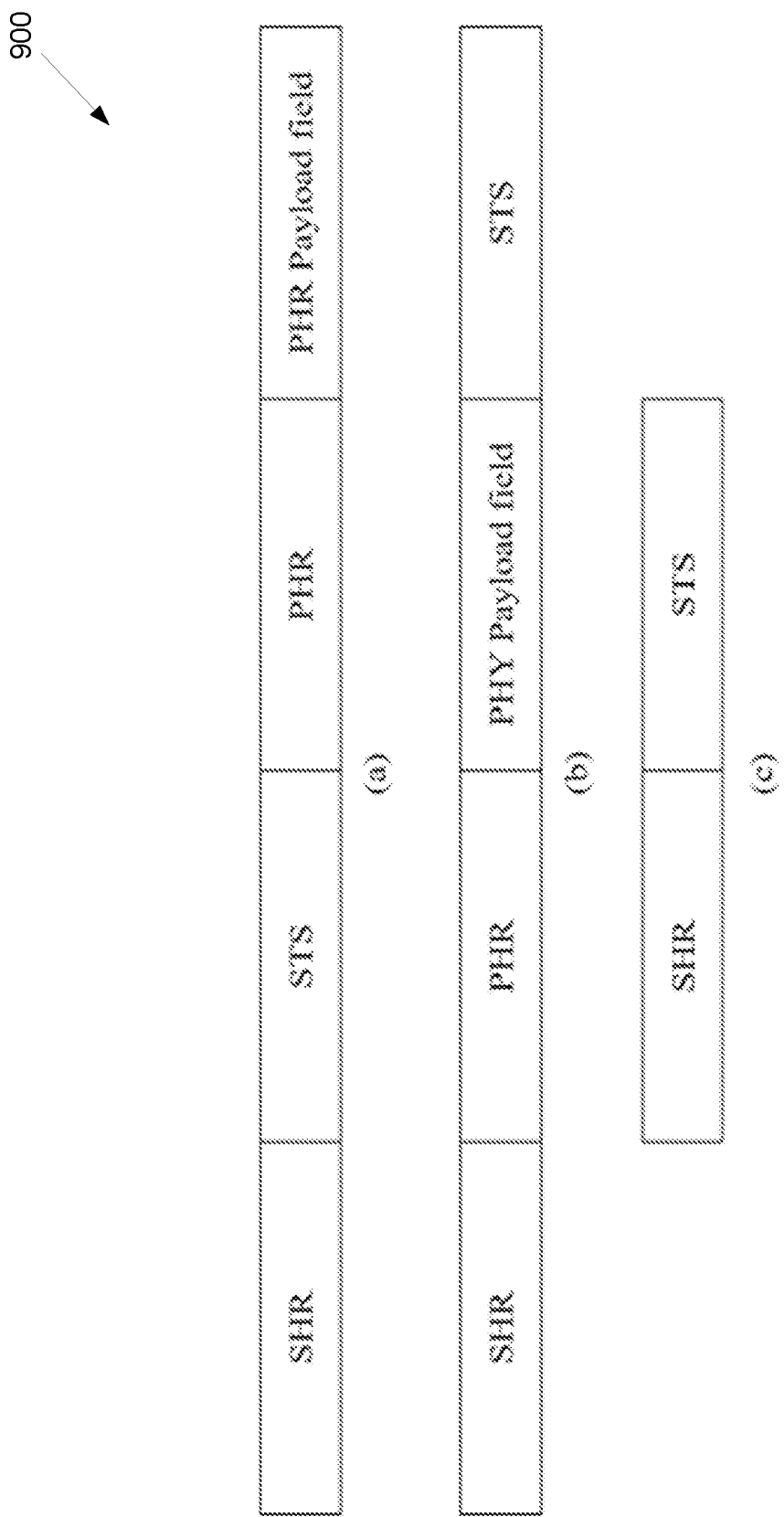
FIG. 9 illustrates an example secure ranging PPDU formats according to embodiments of the present disclosure.

FIG. 9 illustrates an example secure ranging PPDU formats 900 according to embodiments of the present disclosure. The embodiment of secure ranging PPDU formats 900 illustrated in FIG. 9 is for illustration only. FIG. 9 does not limit the scope of the present disclosure to any particular implementation. The secure ranging PPDU formats 900 may be performed in the electronic device 501 (e.g., 101-103 and 111-116 as illustrated in FIG. 1) as illustrated in FIG. 5.

As illustrated in FIG. 9, three secure ranging PPDU formats may be supported, the difference between the formats being the location of the STS and existence of a PHR and PHY payload field as FIG. 9. In FIG. 9, a synchronization header (SHR), a (scrambled timestamp sequence) and a PHY header (PHY) are provided.

Since the STS dynamically change per each ranging frame, it enhances the security to combat attacker. Specifically, it is extremely difficult for attacker to track the exact same STS of desired user for first path detection. However, in the current IEEE 802.15.4z, to update portions of STS may induce transmission of redundant bits. In the present disclosure, an UWB network is provided with ranging requests between a group of devices and another group of devices.

As illustrated in FIG. 6, one or more devices of group-1 has the ranging request to one or more devices of group-2 or vice versa. This disclosure modifies the format of control signaling to enhance the flexibility of adjusting STS.

Figure 10:
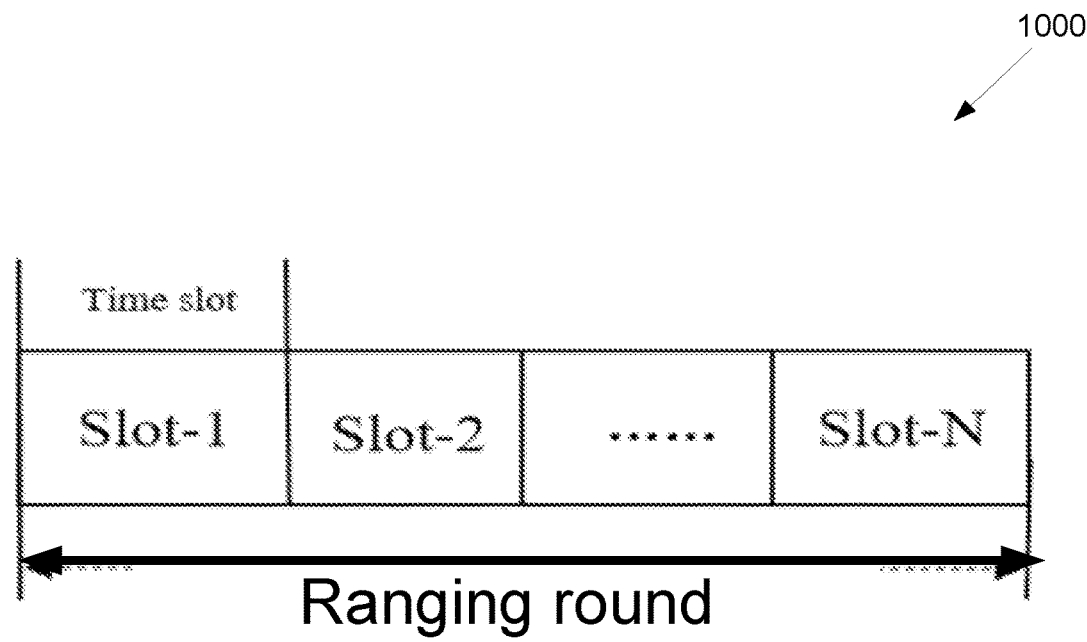
FIG. 10 illustrates an example structure of ranging round according to embodiments of the present disclosure.

FIG. 10 illustrates an example structure of ranging round 1000 according to embodiments of the present disclosure. The embodiment of the structure of ranging round 1000 illustrated in FIG. 10 is for illustration only. FIG. 10 does not limit the scope of the present disclosure to any particular implementation. The structure of ranging round 1000 may be performed in the electronic device 501 (e.g., 101-103 and 111-116 as illustrated in FIG. 1) as illustrated in FIG. 5.

A ranging configuration incorporates the control information of a ranging round, which consists of multiple time slots as FIG. 10. Time slot is the basic time unit to fulfill a message exchange. Other conventions to fulfill the same functionalities as ranging round and time slot are not precluded in this disclosure. Depending on the device capabilities, slot duration and number of time slots in a ranging round can be adjusted in the ranging configuration, or they are fixed to a default setting. One or multiple pairs of devices can participate in a ranging round to fulfill the ranging requests.

Figure 11:
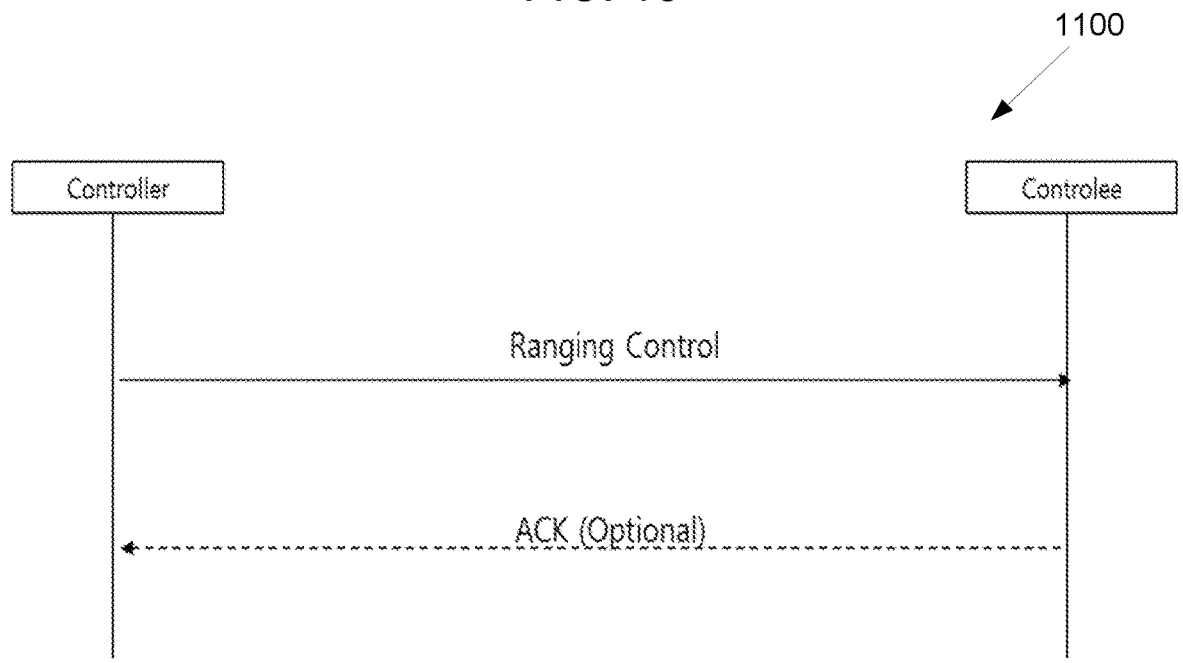
FIG. 11 illustrates a signaling flow including controller and controlee according to embodiments of the present disclosure.

FIG. 11 illustrates a signaling flow including controller and controlee 1100 according to embodiments of the present disclosure. The embodiment of the flow including controller and controlee 1100 illustrated in FIG. 11 is for illustration only. FIG. 11 does not limit the scope of the present disclosure to any particular implementation. The flow including controller and controlee 1100 may be performed in the electronic device 501 as illustrated in FIG. 5. The flow including controller and controlee 1100 may be performed in the electronic device 501 (e.g., 101-103 and 111-116 as illustrated in FIG. 1) as illustrated in FIG. 5.

The setting of a ranging configuration determined by the next higher layer can be sent to one or more ranging controlees from a ranging controller (lead device) as illustrated in FIG. 11. With different network formations, the ranging configuration can be conveyed via a dedicated data frame sent to one or more devices, or it can be embedded into a sync frame broadcast to all devices in the network. Meanwhile, this disclosure does not preclude other methods to exchange the ranging configuration information, e.g., via the higher layer or our-of-band management.

Figure 12:
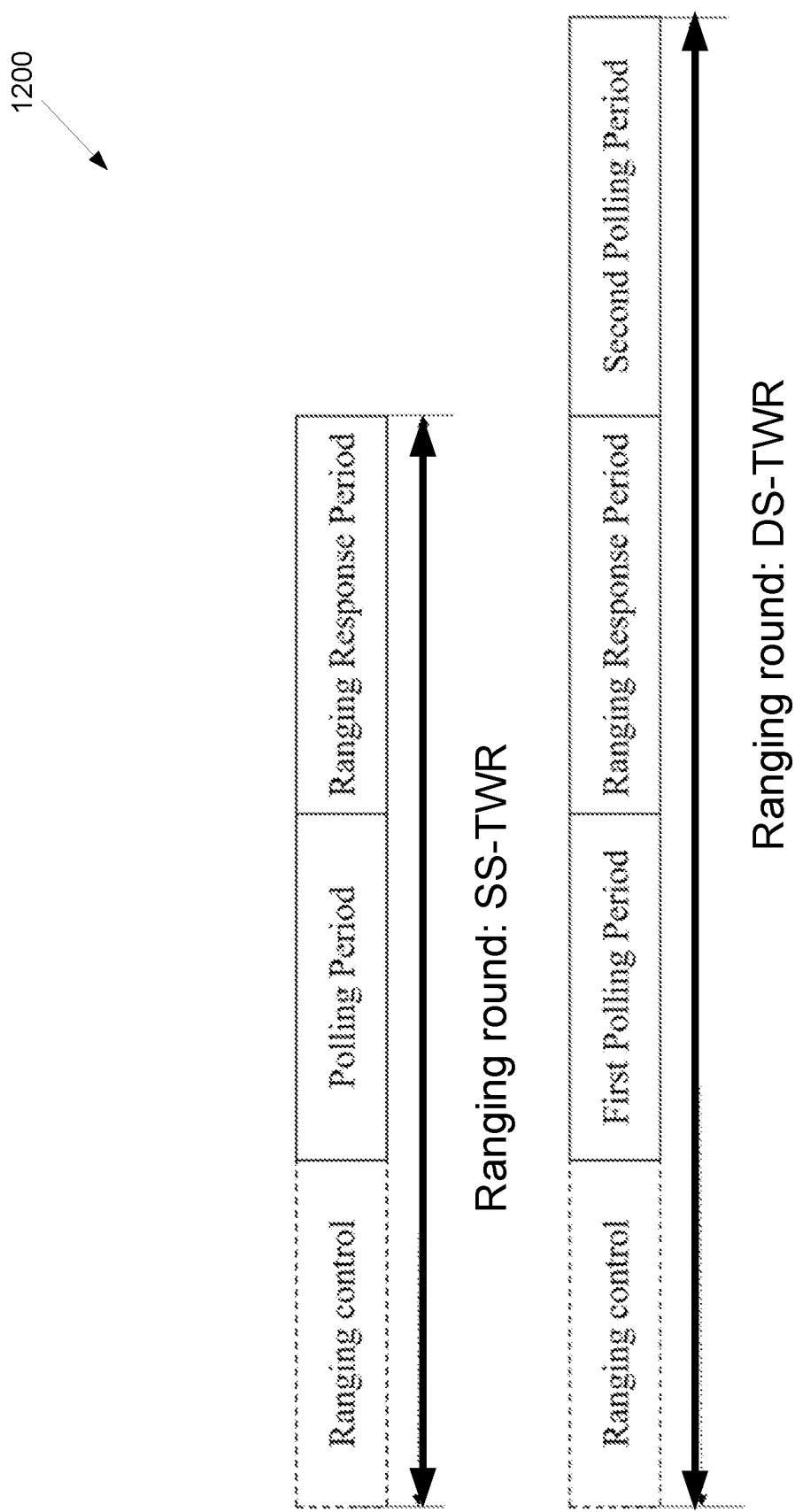
FIG. 12 illustrates an example ranging round structure according to embodiments of the present disclosure.

FIG. 12 illustrates an example ranging round structure 1200 according to embodiments of the present disclosure. The embodiment of the ranging round structure 1200 illustrated in FIG. 12 is for illustration only. FIG. 12 does not limit the scope of the present disclosure to any particular implementation. The ranging round structure 1200 may be performed in the electronic device 501 (e.g., 101-103 and 111-116 as illustrated in FIG. 1) as illustrated in FIG. 5.

Ranging configuration includes the structure of a ranging round which contains one or more polling periods (PP) and one or more ranging response periods (RRP), where a PP consists of one or more time slots to send polling messages from initiator(s), and an RRP consists one or more time slots to send response messages from responder(s). FIG. 12 respectively illustrates two examples for the SS-TWR and DS-TWR with three message exchanges, other examples are not precluded. A ranging round can start with a ranging control period to exchange the ranging configuration over the UWB MAC. However, a ranging round can also start with a polling period if the ranging configuration is exchanged at the higher layer.

As illustrated in FIG. 12, for the SS-TWR, one ranging round contains a PP and an RRP. For the DS-TWR with three messages, one ranging round contains a first PP, an RRP, and a second PP. Each period consists of one or more time slots, where transmissions from initiator(s)/responder(s) can be scheduled as determined by the next higher layer or they can contend time slots in the corresponding periods, respectively.

Figure 13:
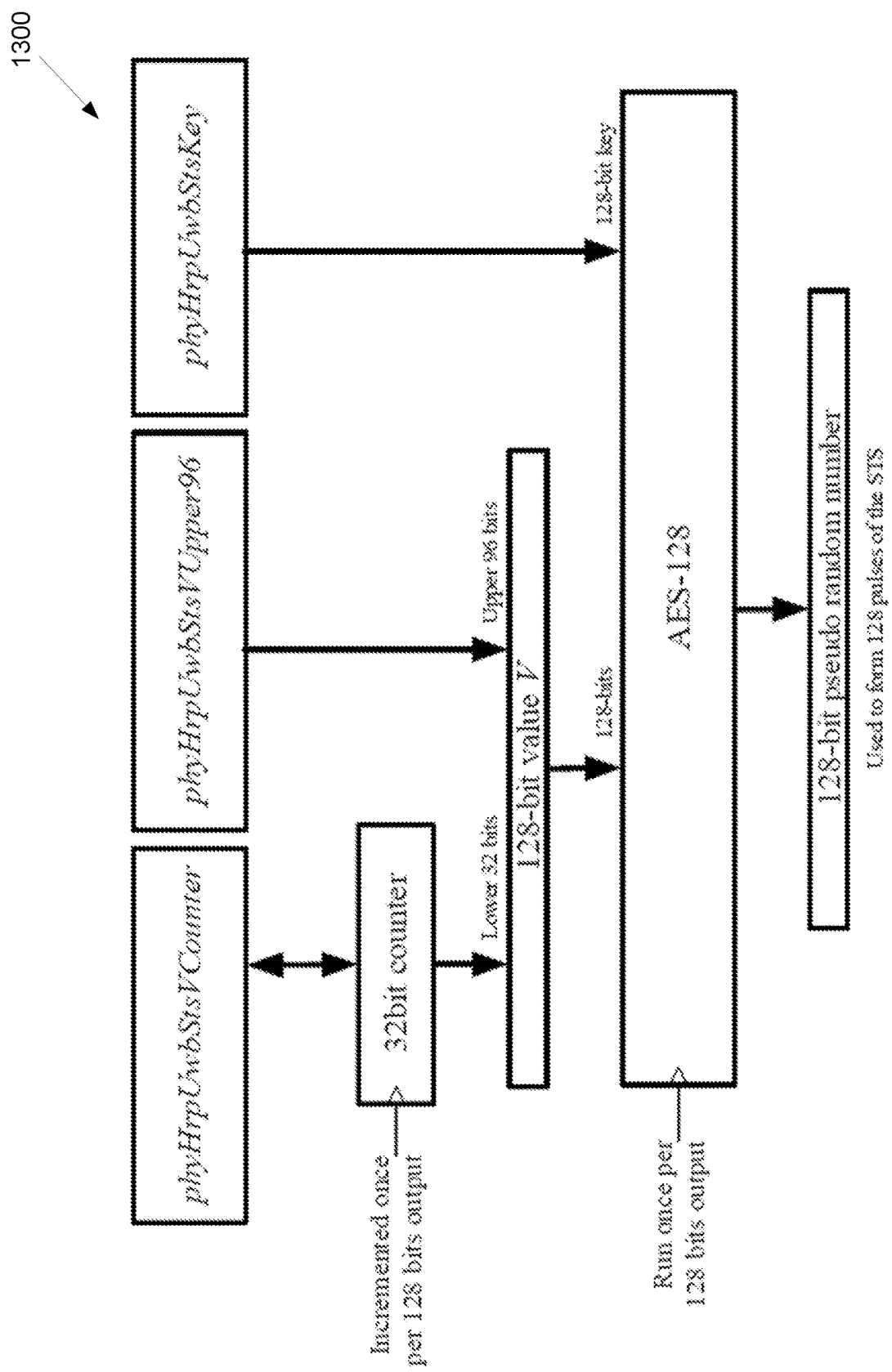
FIG. 13 illustrates an example DRBG for STS according to embodiments of the present disclosure.

FIG. 13 illustrates an example DRBG for STS 1300 according to embodiments of the present disclosure. The embodiment of the DRBG for STS 1300 illustrated in FIG. 13 is for illustration only. FIG. 13 does not limit the scope of the present disclosure to any particular implementation. The DRBG for STS 1300 may be performed in the electronic device 501 (e.g., 101-103 and 111-116 as illustrated in FIG. 1) as illustrated in FIG. 5.

The STS may be generated using a deterministic random bit generator (DRBG). The structure of the DRBG is shown in FIG. 13. Each time the DRBG is run, it produces a 128-bit pseudo-random number used to form 128 pulses of the STS.

As illustrated in FIG. 13, the upper layer is responsible for setting the 128-bit key, via the phyHrpUwbStsKey attribute, along with the 128-bit initial value for V, via the phyHrpUwbStsVCounter and phyHrpUwbStsVUpper96 attributes. The 32-bit counter part of V is incremented before each iteration of the DRBG to give a new V value each time it is run to produce 128 bits/pulses for the STS. The receiver may use the same mechanism and aligned values of the key and V to generate a complementary sequence for cross correlation with the transmitted sequence. The mechanisms for agreeing, coordinating and synchronizing these values between HRP-SRDEV, are the responsibility of the upper layers.

FIG. 14 illustrates an example RSKI IE content field format 1400 according to embodiments of the present disclosure. The embodiment of the RSKI IE content field format 1400 illustrated in FIG. 14 is for illustration only. FIG. 14 does not limit the scope of the present disclosure to any particular implementation. The RSKI IE content field format 1400 may be performed in the electronic device 501 (e.g., 101-103 and 111-116 as illustrated in FIG. 1) as illustrated in FIG. 5.

In the current spec of IEEE 802.15.4z, the ranging STS Key and IV IE (RSKI IE) may be used to convey and align the seed, (i.e., key and data IV), used for STS generation. The content field of the RSKI IE may be formatted as shown in FIG. 14.

The IVC field indicates the content of the STS IV Counter field as follows: an IVC field value of means that just the 4-octet Counter portion of the IV is included, while an IVC field value of 1 means that the full 16-octet IV is included. The SKP field indicates the presence of the STS Key field as follows: an SKP field value of 0 means that the STS Key field is not present, (is zero octets), while an SKP field value of 1 means that the 16-octet STS Key field is present.

The ICP field indicates the presence of the Integrity Code field.

The CP field is used when the RSKI IE is only conveying the 4-octet Counter portion of the IV, where a CP field value of 1 means the counter value applies to the current packet. A CP field value of 0 means that the RSKI IE applies to a future packet exchange.

The STS IV counter field contains either a 16-octet string intended to initialize the full IV or a 4-octet string intended to set just counter portion of the IV. This is determined by the IVC field.

The STS Key field if present, as determined by the SKP field, contains either a 16-octet string intended to initialize the STS Key.

The integrity code field if present, as determined by the ICP field, contains a code intended to allow the upper layer to validate the supplied STS Key and STS IV counter fields.

The STS Key, STS IV Counter and Integrity Code fields of the RSKI IE are determined and consumed by the upper layer. The upper layer is responsible for validating these as necessary and programming the phyHrpUwbStsKey, phyHrpUwbStsVUpper96 and phyHrpUwbStsVCounter PIB attributes accordingly.

FIG. 15 illustrates an example modified content field format of RSKI IE 1500 according to embodiments of the present disclosure. The embodiment of the modified content field format of RSKI IE 1500 illustrated in FIG. 15 is for illustration only. FIG. 15 does not limit the scope of the present disclosure to any particular implementation. The modified content field format of RSKI IE 1500 may be performed in the electronic device 501 (e.g., 101-103 and 111-116 as illustrated in FIG. 1) as illustrated in FIG. 5.

As illustrated in FIG. 14, the STS IV counter can be used to exchange the full V value formed by phyHrpUwbStsVCounter and phyHrpUwbStsVUpper96 attributes in FIG. 13, or its lower 32-bit counter in phyHrpUwbStsVCounter. In order to exchange the update for other portions, rather than lower 32-bit counter, of V, the full V value has to be sent in the RSKI IE, and occupies 16-octet, whereas many bit fields may be redundant to transmit. To enhance the flexibility of adjusting STS update, a modified content field structure of RSKI IE is illustrated in FIG. 15.

The first field of IV present (IVP) with 4-bit is used to indicate which portion of IV may be updated by the field of STS IV Counter. Specifically, 4 bits of IVP represent the bit ranges of IV, i.e., 1~32, 33~64, 65~96, and 97~128, respectively. STS IV Counter field concatenates 4-byte (32-bit) strings that are used to update IV portions with corresponding bit field being 1 in IVP.

For example, if value of IVP field is "1111," then STS IV counter field conveys the full 16-octet to update IV. If value of IVP is "1001," then STS IV counter conveys 8-octet string, where first 4-octet string is used to update 1~32 bits of IV, and later 4-octet string is used to update 97~128 bits of IV. Other fields of FIG. 15 remain the same as those of FIG. 14. The present disclosure does not preclude other combinations of bit fields to fulfill the same function.

FIG. 16 illustrates another example modified content field format of RSKI IE 1600 according to embodiments of the present disclosure. The embodiment of the modified content field format of RSKI IE 1600 illustrated in FIG. 16 is for illustration only. FIG. 16 does not limit the scope of the present disclosure to any particular implementation. The modified content field format of RSKI IE 1600 may be performed in the electronic device 501 (e.g., 101-103 and 111-116 as illustrated in FIG. 1) as illustrated in FIG. 5.

As illustrated in FIG. 16, the fields of IVS and IVE indicate the starting byte index and ending byte index of IV respectively, which specify the range of IV that may be updated by the field of STS IV Counter. For example, if IVS is "0100," and IVE is "1000," the starting byte index is 4, and the ending byte index is 8. Therefore, STS IV Counter occupies 5-octet to update 4~8 bytes of IV. Note that the index of first byte of IV is zero, i.e., "0000." The size of STS IV Counter is aligned with the range specified by IVS and IVE. This disclosure does not preclude other options to specify the bit ranges of IV, where STS IV Counter may apply to update.

Figure 17:
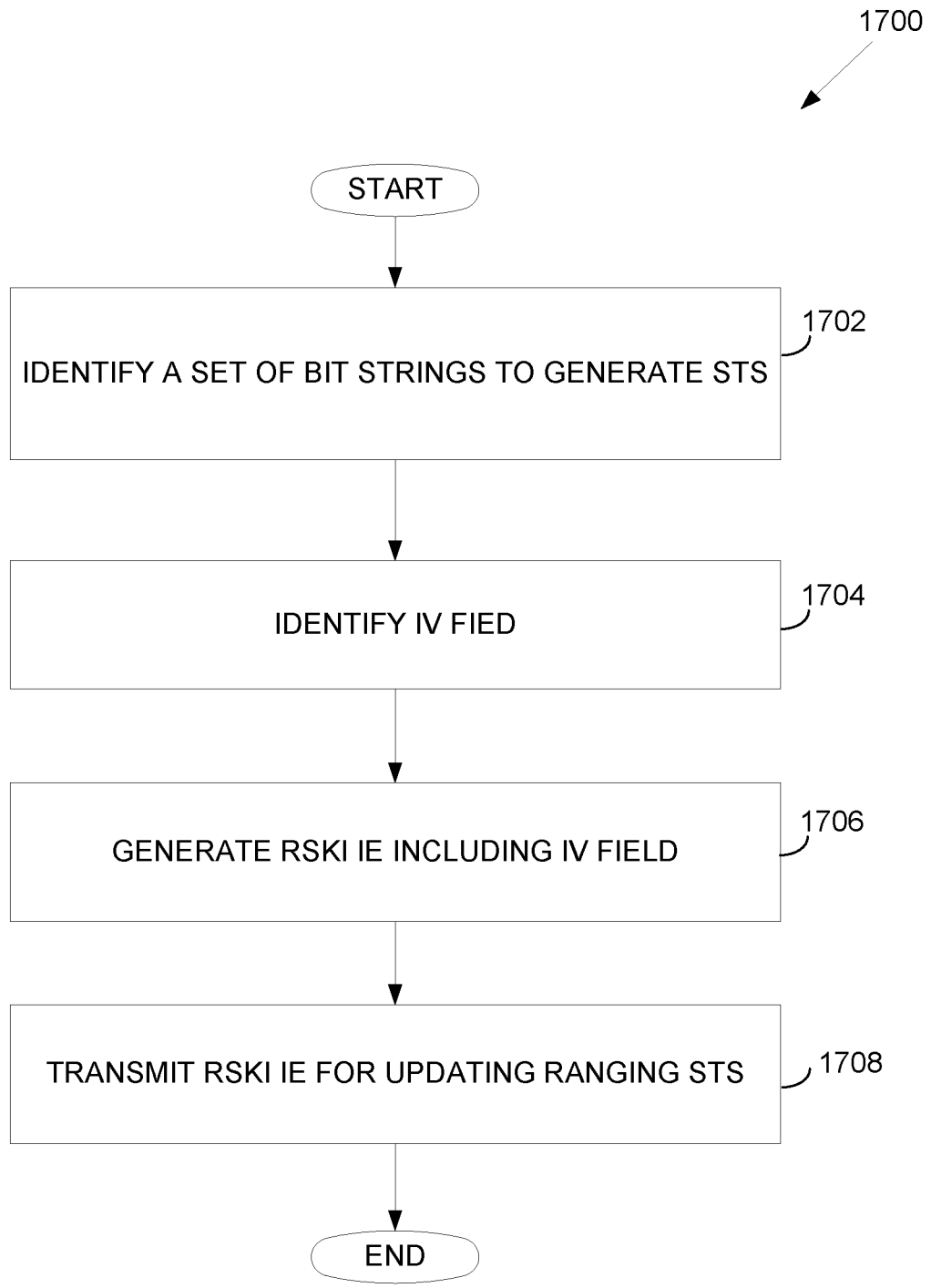
FIG. 17 illustrates a flowchart of a method for changing STS index/counter according to embodiments of the present disclosure.

FIG. 17 illustrates a flowchart of a method 1700 for changing STS index/counter according to embodiments of the present disclosure, as may be performed by a network entity. The embodiment of the method 1700 illustrated in FIG. 17 is for illustration only. FIG. 17 does not limit the scope of the present disclosure to any particular implementation. The method 1700 may be performed in the electronic device 501 (e.g., 101-103 and 111-116 as illustrated in FIG. 1) as illustrated in FIG. 5. The electronic device may be implemented as a network entity supporting a ranging operation.

As illustrated in FIG. 17, the method 1700 begins at step 1702. In step 1702, the network entity identifies at least one set of bit strings to generate a ranging scrambled timestamp sequence (STS).

Subsequently, the network entity in step 1704 identifies at least one initialization vector (IV) field corresponding to the at least one set of bit strings, wherein the at least one IV field comprises a 4-octet string.

Next, the network entity in step 1706 generates a ranging STS key and IV information element (RSKI IE) that includes the at least one IV field to convey and align a seed that is used to generate the ranging STS.

In one embodiment, the RSKI IE includes: an IV starting (IVS) field indicating a starting byte index of the IV field; an IV ending (IVE) field indicating an ending byte index of the IV field; an STS IV counter field indicating a value of STS IV counter; and the IVS field and the IVE field identify a range of the IV field that is updated by the STS IV counter field.

Finally, the network entity in step 1708 transmits, to another network entity, the generated RSKI IE for updating the ranging STS of the second network entity.

In one embodiment, the network entity generates the RSKI IE to include an IV counter present (IVCP) field indicating whether an IV counter field is included in the RSKI IE.

In such embodiment, the IV counter field includes a 4-octet string comprising information to set an IV counter.

In one embodiment, the network entity generates the RSKI IE to include at least one IV present (IVP) field indicating whether the at least one IV field is included in the RSKI IE.

In such embodiment, the at least one IVP field includes: an IV1P field indicating whether an IV1 field is included in the RSKI IE; an IV2P field indicating whether an IV2 field is included in the RSKI IE; an IV3P field indicating whether an IV3 field is included in the RSKI IE; the IV1 field includes a 4-octet string that is used to set bits 32 to 63 for updating an IV counter; the IV2 field includes a 4-octet string that is used to set bits 64 to 95 for updating the IV counter; and the IV3 field includes a 4-octet string that is used to set bits 96 to 127 for updating the IV counter.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope

What is claimed is:

1. A first network entity in a wireless communication system, the first network entity comprising:
    a processor configured to:
        identify at least one bit to indicate whether a bit range of seed data used to generate a ranging scrambled timestamp sequence (STS) is included in a ranging STS key and data information element,
        identify at least one field, wherein the at least one field comprises a 4-octet string to set bits of the bit range of the seed data in case that the bit range of the seed data is included in the ranging STS key and data information element, and
        generate the ranging STS key and data information element that includes the at least one field to convey and align the seed data used to generate the ranging STS; and
    a transceiver operably connected to the processor, the transceiver configured to transmit, to a second network entity, the ranging STS key and data information element,
    wherein the first and the second network entity are aligned, via a higher layer signaling, to transmit and receive, respectively, the ranging STS key and data information element.

2. The first network entity of claim 1, wherein the processor is further configured to generate the ranging STS key and data information element to include a counter present (CP) field indicating whether a counter field is included in the ranging STS key and data information element.

3. The first network entity of claim 2, wherein the counter field includes a 4-octet string comprising information to set a counter.

4. The first network entity of claim 1, wherein the processor is further configured to generate the ranging STS key and data information element to include a SKP field indicating whether a STS key field is present in the ranging STS key and data information element.

5. The first network entity of claim 1, wherein the at least one bit includes:
    a V1P field indicating whether a V1 field is included in the ranging STS key and data information element;
    a V2P field indicating whether a V2 field is included in the ranging STS key and data information element; and
    a V3P field indicating whether a V3 field is included in the ranging STS key and data information element.

6. The first network entity of claim 5, wherein:
    the V1 field includes a 4-octet string that is used to set bits 32 to 63 of the seed data;
    the V2 field includes a 4-octet string that is used to set bits 64 to 95 of the seed data; and
    the V3 field includes a 4-octet string that is used to set bits 96 to 127 of the seed data.

7. The first network entity of claim 1, wherein the ranging STS key and data information element further includes a CP field indicating whether a counter field is present.

8. A second network entity in a wireless communication system, the second network entity comprising:
    a transceiver configured to receive, from a first network entity, a ranging scrambled timestamp sequence (STS) key and data information element, wherein the first and the second network entity are aligned, via a higher layer signaling, to transmit and receive, respectively, the ranging STS key and data information element; and
    a processor operably connected to the transceiver, the processor configured to:
        identify the ranging STS key and data information element that includes at least one field to be used to convey and align seed data used to generate a ranging STS;
        identify the at least one field, wherein the at least one field comprises a 4-octet string to set bits of a bit range of the seed data in case that the bit range of the seed data is included in the ranging STS key and data information element; and
        identify at least one bit of the bit range to identify the ranging STS.

9. The second network entity of claim 8, wherein the processor is further configured to generate the ranging STS key and data information element to include a counter present (CP) field indicating whether a counter field is included in the ranging STS key and data information element.

10. The second network entity of claim 9, wherein the counter field includes a 4-octet string comprising information to set a counter.

11. The second network entity of claim 8, wherein the processor is further configured to generate the ranging STS key and data information element to include a SKP field indicating whether a STS Key field is present in the ranging STS key and data information element.

12. The second network entity of claim 8, wherein the at least one bit includes:
    a V1P field indicating whether a V1 field is included in the ranging STS key and data information element;
    a V2P field indicating whether a V2 field is included in the ranging STS key and data information element; and
    a V3P field indicating whether a V3 field is included in the ranging STS key and data information element.

13. The second network entity of claim 12, wherein:
    the V1 field includes a 4-octet string that is used to set bits 32 to 63 of the seed data;
    the V2 field includes a 4-octet string that is used to set bits 64 to 95 of the seed data; and
    the V3 field includes a 4-octet string that is used to set bits 96 to 127 of the seed data.

14. The second network entity of claim 8, wherein the ranging STS key and data information element further includes a CP field indicating whether a counter field is present.

15. A method of a first network entity in a wireless communication system, the method comprising:
    identifying at least one bit to indicate whether a bit range of seed data used to generate a ranging scrambled timestamp sequence (STS) is included in a ranging STS key and data information element;
    identifying at least one field, wherein the at least one field comprises a 4-octet string to set bits of the bit range of the seed data in case that the bit range of the seed data is included in the ranging STS key and data information element; and generating the ranging STS key and data information element that includes the at least one field to convey and align the seed data used to generate the ranging STS; and transmitting, to a second network entity, the ranging STS key and data information element, wherein the first and the second network entity are aligned, via a higher layer signaling, to transmit and receive, respectively, the ranging STS key and data information element.

16. The method of claim 15, further comprising generating the ranging STS key and data information element to include a counter present (CP) field indicating whether a counter field is included in the ranging STS key and data information element.

17. The method of claim 16, wherein the counter field includes a 4-octet string comprising information to set a counter.

18. The method of claim 15, further comprising generating the ranging STS key and data information element to include a SKP field indicating whether a STS Key field is present in the ranging STS key and data information element.

19. The method of claim 15, wherein the at least one bit includes:

a V1P field indicating whether a V1 field is included in the ranging STS key and data information element;

a V2P field indicating whether a V2 field is included in the ranging STS key and data information element;

a V3P field indicating whether a V3 field is included in the ranging STS key and data information element;

the V1 field includes a 4-octet string that is used to set bits 32 to 63 of the seed data;

the V2 field includes a 4-octet string that is used to set bits 64 to 95 of the seed data; and the V3 field includes a 4-octet string that is used to set bits 96 to 127 of the seed data.

20. The method of claim 15, wherein the ranging STS key and data information element further includes a CP field indicating whether a counter field is present.

* * * * *